United States Patent
Murayama et al.

(10) Patent No.: US 8,892,179 B2
(45) Date of Patent: Nov. 18, 2014

(54) COUPLING OF HOUSINGS OF AN ELECTRONIC APPARATUS

(75) Inventors: Kazunori Murayama, Kawasaki (JP); Hitoshi Shiroyama, Kawasaki (JP); Shigeru Yamaguchi, Kawasaki (JP); Hisamitsu Takagi, Inagi (JP)

(73) Assignee: Fujitsu Limited, Kawasaki (JP)

( * ) Notice: Subject to any disclaimer, the term of this patent is extended or adjusted under 35 U.S.C. 154(b) by 146 days.

(21) Appl. No.: 13/420,747

(22) Filed: Mar. 15, 2012

(65) Prior Publication Data

US 2012/0238334 A1    Sep. 20, 2012

(30) Foreign Application Priority Data

Mar. 18, 2011   (JP) .................. 2011-061759

(51) Int. Cl.
*H04M 1/00* (2006.01)
*H04M 1/02* (2006.01)
*H04W 88/02* (2009.01)

(52) U.S. Cl.
CPC .......... *H04M 1/0237* (2013.01); *H04M 1/0227* (2013.01); *H04W 88/02* (2013.01)
USPC .............. 455/575.4; 455/575.1; 455/90.3; 455/347; 340/13.32; 340/693.5; 248/309.1

(58) Field of Classification Search
CPC .......... F16C 9/04; F16C 7/023; F16C 33/107; A61B 2017/2936; F04C 18/0215; E05D 7/08
USPC ................ 455/575.1; 340/13.32, 693.5, 7.62, 340/12.55; 248/309.1–316.8
See application file for complete search history.

(56) References Cited

U.S. PATENT DOCUMENTS 6,853,554 B2 * 2/2005 Bash et al. .................... 361/699
7,059,776 B2 * 6/2006 Kobayashi et al. ........... 384/470
(Continued)

FOREIGN PATENT DOCUMENTS

JP   2007-067892 A   3/2007
JP   2008-103989 A   5/2008
(Continued)

OTHER PUBLICATIONS

Office Action of Japanese Patent Application No. 2011-061759 dated Aug. 5, 2014 with Partial Translation.

*Primary Examiner* — Quan M Hua
(74) *Attorney, Agent, or Firm* — Maschoff Brennan

(57) ABSTRACT

An electronic apparatus includes a first housing, a second housing and a coupling portion movably coupling the first housing and the second housing to each other. The first housing includes a guide groove formed in a surface of the first housing facing the second housing that restricts a direction of movement of the first housing and the second housing with respect to each other. The guide groove includes a bottom portion. The coupling portion includes a coupling main body fixed to a surface of the second housing facing the first housing, a guide pin protruding from the coupling main body so as to be able to advance and retreat within the guide groove and including a tip portion, the tip portion being housed in the guide groove, and an urging member urging the guide pin toward the bottom portion of the guide groove.

19 Claims, 7 Drawing Sheets

(56) References Cited

U.S. PATENT DOCUMENTS

| | | | |
|---|---|---|---|
| 7,567,830 B2* | 7/2009 | Hur | 455/575.4 |
| 2006/0025184 A1* | 2/2006 | Cho et al. | 455/575.4 |
| 2008/0096619 A1* | 4/2008 | Kuga et al. | 455/575.4 |
| 2008/0280659 A1* | 11/2008 | Oh et al. | 455/575.4 |
| 2010/0197372 A1 | 8/2010 | Takagi et al. | |
| 2010/0248796 A1* | 9/2010 | Higashigawa et al. | 455/575.4 |
| 2010/0248798 A1* | 9/2010 | Ishikawa et al. | 455/575.4 |

FOREIGN PATENT DOCUMENTS

| | | |
|---|---|---|
| JP | 2008-252801 A | 10/2008 |
| JP | 2010-178223 A | 8/2010 |
| JP | 2010-239592 A | 10/2010 |

* cited by examiner

COUPLING OF HOUSINGS OF AN ELECTRONIC APPARATUS

CROSS-REFERENCE TO RELATED APPLICATIONS

This application is based upon and claims the benefit of priority of the prior Japanese Patent Application No. 2011-061759, filed on Mar. 18, 2011, the entire contents of which are incorporated herein by reference.

FIELD

The embodiments discussed herein are related to an electronic apparatus.

BACKGROUND

An electronic apparatus, such as a cellular phone, may include a fixed-side housing and a movable-side housing which are coupled to each other by a coupling portion such that the movable-side housing can rotate or slide relative to the fixed-side housing. For example, in a sliding cellular phone, a movable-side housing slides relative to a fixed-side housing, thereby enabling a state change between a closed state and an open state and making the cellular phone compact. In a rotating cellular phone, a movable-side housing rotates relative to a fixed-side housing, thereby improving the visibility of a display portion of the rotating cellular phone.

In an electronic apparatus in which two housings are coupled to each other movably by a coupling portion as described above, one of the housings may be provided with a guide hole that restricts the moving direction of the two housings. A guide pin that is passed through the guide hole is provided in the other housing or the coupling portion. In the case where one of the housings moves relative to the other housing, the guide pin moves in the guide hole within the range restricted by the guide hole. The two housings can thereby be moved smoothly with respect to each other.

However, in a conventional electronic apparatus having a guide pin passed through a guide hole, there is a problem of increase in size in the thickness direction. That is to say, in the above-described conventional electronic apparatus, a flange is formed at the tip of the guide pin in order to prevent withdrawal of the guide pin from the guide hole. This flange is brought into contact with a part of the housing around the guide hole. For this reason, the thickness of the entire apparatus is increased by the thickness of the flange.

On the other hand, in a configuration in which a flange is not formed at the tip of a guide pin, the guide pin may be accidentally withdrawn from the guide hole, and the restriction of the moving direction of the two housings may be easily released. If the restriction of the moving direction of the two housings is released, it may be difficult to move the two housings smoothly with respect to each other.

SUMMARY

According to an aspect of an embodiment, an electronic apparatus includes a first housing, a second housing and a coupling portion movably coupling the first housing and the second housing to each other. The first housing includes a guide groove formed in a surface of the first housing facing the second housing that restricts a direction of movement of the first housing and the second housing with respect to each other. The guide groove includes a bottom portion. The coupling portion includes a coupling main body fixed to a surface of the second housing facing the first housing, a guide pin protruding from the coupling main body so as to be able to advance and retreat within the guide groove and including a tip portion, the tip portion being housed in the guide groove, and an urging member configured to urge the guide pin toward the bottom portion of the guide groove.

The object and advantages of the various embodiments will be realized and attained by means of the elements and combinations particularly pointed out in the claims. It is to be understood that both the foregoing general description and the following detailed description are exemplary and explanatory and are not restrictive of the various embodiments, as claimed.

Additional aspects and/or advantages will be set forth in part in the description which follows and, in part, will be apparent from the description, or may be learned by practice of the various embodiments.

DESCRIPTION OF EMBODIMENTS

Hereinafter, an embodiment of the electronic apparatus disclosed by this application will be described with reference to the drawings. Although the following embodiment illustrates a cellular phone as an example of the electronic apparatus disclosed by this application, the electronic apparatus disclosed by this application may be any one of various electronic apparatuses other than a cellular phone, such as a personal computer, a PDA (Personal Digital Assistant), a portable game machine or etc.

Figure 1:
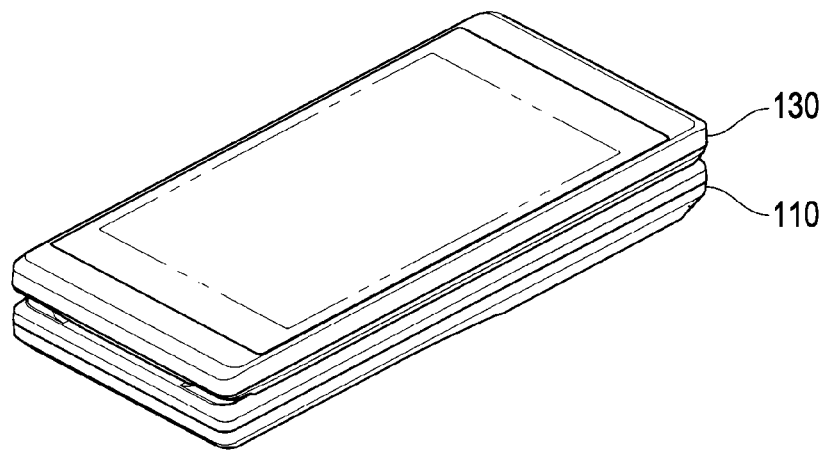
FIG. 1 is an external perspective view illustrating a closed state of a cellular phone according to an example embodiment.
Figure 2:
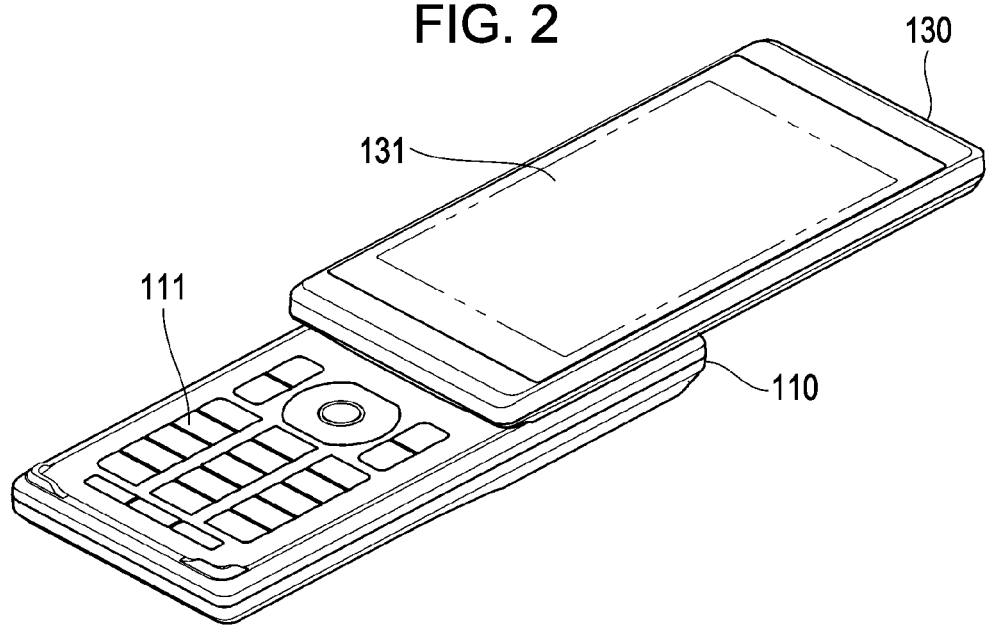
FIG. 2 is an external perspective view illustrating an example open state of the cellular phone of FIG. 1.
Figure 3:
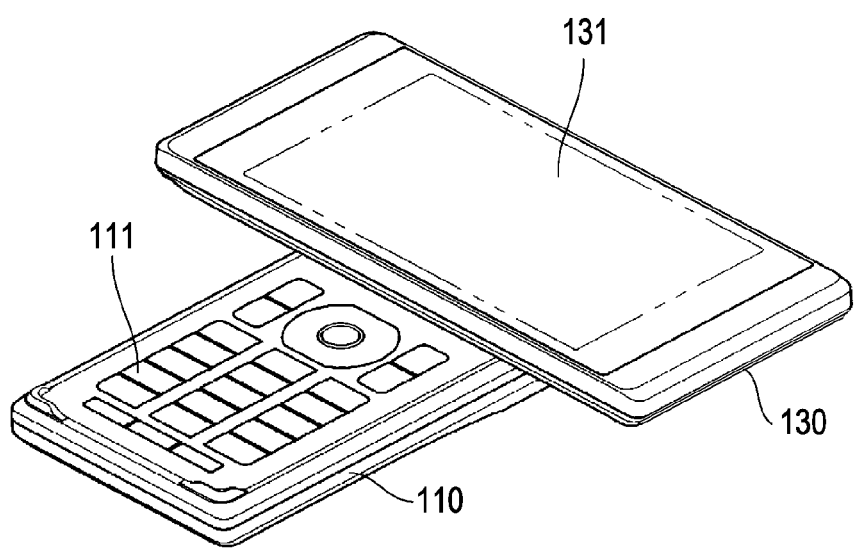
FIG. 3 is an external perspective view illustrating an example rotated state of the cellular phone of FIG. 1.

First, the external configuration of a cellular phone 100 according to some embodiments will be described. FIG. 1 is an external perspective view illustrating a closed state of the cellular phone 100 according to an example embodiment. FIG. 2 is an external perspective view illustrating an example open state of the cellular phone 100 of FIG. 1. FIG. 3 is an external perspective view illustrating an example rotated state of the cellular phone 100 of FIG. 1.

As illustrated in FIGS. 1, 2 and 3, the cellular phone 100 includes a fixed-side housing 110 and a movable-side housing 130. The fixed-side housing 110 includes an operating portion 111 having operating buttons. The movable-side housing 130 includes a display portion 131 having a display screen. The movable-side housing 130 is an example of a first housing and the fixed-side housing 110 is an example of a second housing.

A coupling portion 150 (see, e.g., FIG. 4) described in greater detail below is interposed between the fixed-side housing 110 and the movable-side housing 130. The coupling portion 150 is configured to slidably and rotatably couple the fixed-side housing 110 and the movable-side housing 130 to each other. By a sliding operation and/or a rotating operation of the movable-side housing 130 relative to the fixed-side housing 110 using the coupling portion 150, the cellular phone 100 may change to any one of the closed state illustrated in FIG. 1, the open state illustrated in FIG. 2, and the rotated state illustrated in FIG. 3.

The closed state illustrated in FIG. 1 is a state where the fixed-side housing 110 and the movable-side housing 130 overlap such that the area of overlap is largest. In the closed state of FIG. 1, the total longitudinal length of the cellular phone 100 may be the shortest of any of the three states depicted in FIGS. 1, 2 and 3. Accordingly, the cellular phone 100 may be set to the closed state, for example, when a user carries the cellular phone 100 or when the user uses a simple function executable without using the operating portion 111, such as viewing a call history of the cellular phone 100.

The open state illustrated in FIG. 2 is a state where, owing to the sliding operation of the movable-side housing 130 relative to the fixed-side housing 110, the fixed-side housing 110 and the movable-side housing 130 overlap such that the area of overlap is smallest out of the three states depicted in FIGS. 1, 2 and 3. In the open state of FIG. 2, the total longitudinal length of the cellular phone 100 may be the longest of any of the three states depicted in FIGS. 1, 2 and 3. In the open state, the operating portion 111 of the fixed-side housing 110 is exposed, as illustrated in FIG. 2. Accordingly, the cellular phone 100 may be set to the open state, for example, during a call or when the user performs an operation using the operating portion 111, such as composing an e-mail message.

The rotated state illustrated in FIG. 3 is a state where the movable-side housing 130 is rotated 90 degrees with respect to the fixed-side housing 110. As illustrated in FIG. 3, the rotated state is a state where the display portion 131 is generally orthogonal with respect to the fixed-side housing 110. Accordingly, the cellular phone 100 may be set to the rotated state, for example, when the user watches a video or browses a web page.

Figure 4:
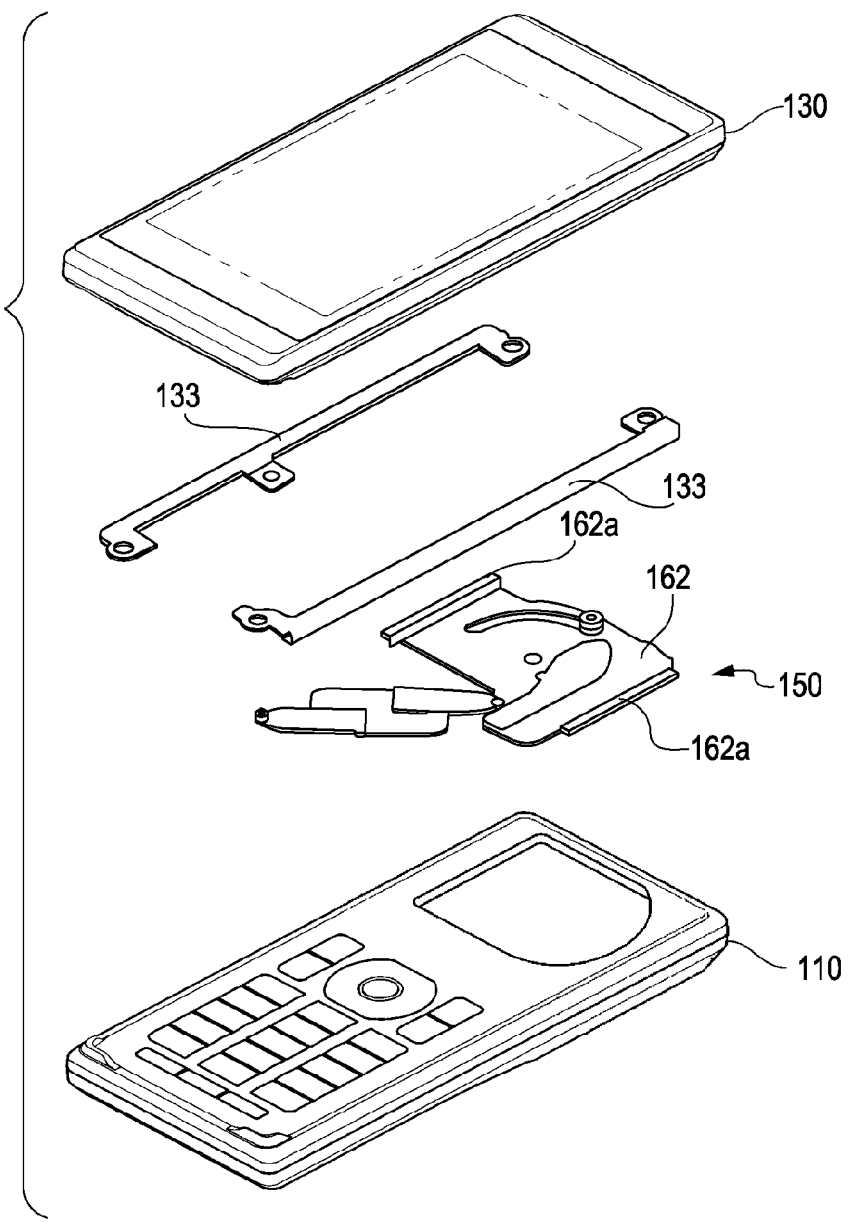
FIG. 4 is an exploded perspective view of a coupling portion of the cellular phone of FIG. 1 and its surroundings in the closed state of FIG. 1.
Figure 5:
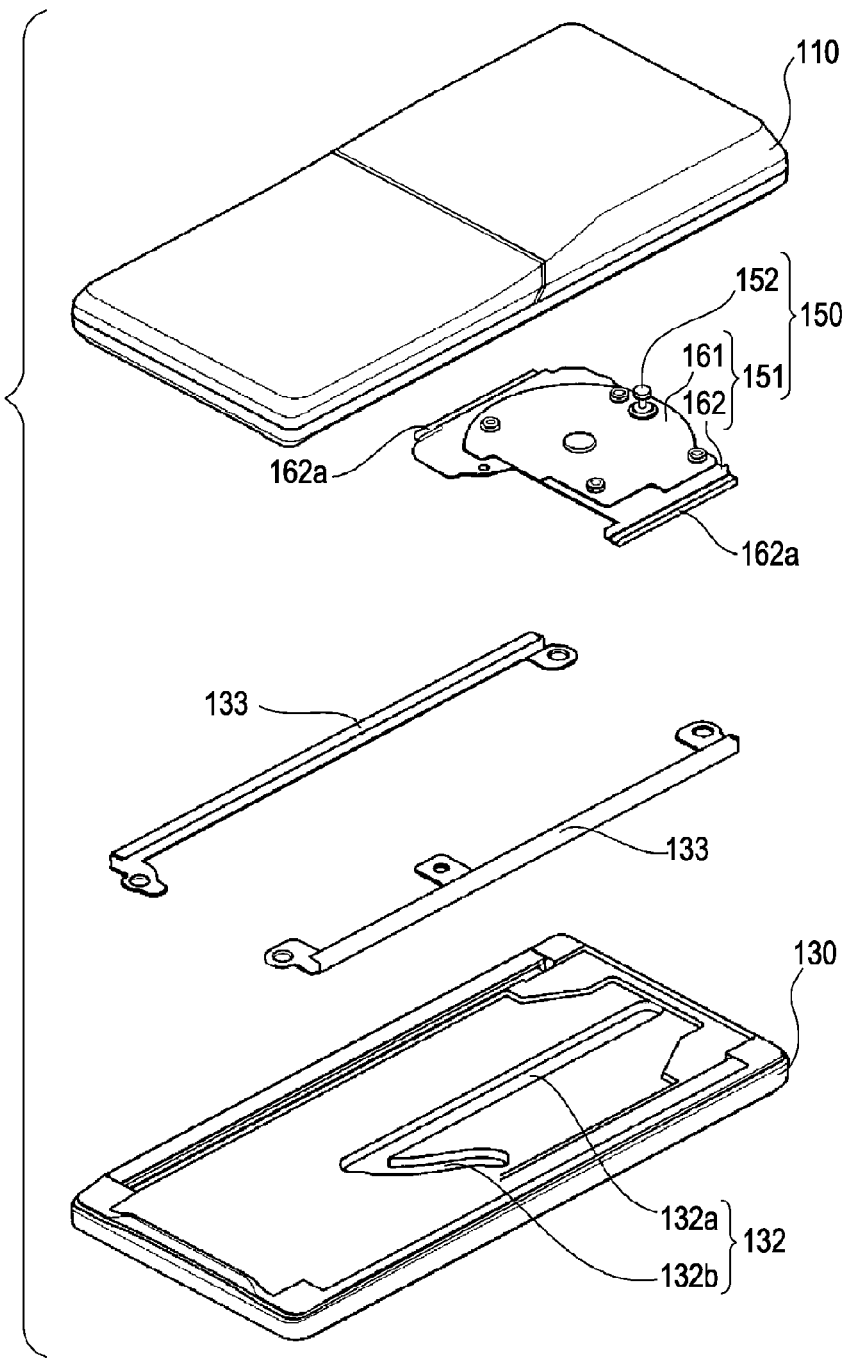
FIG. 5 is an exploded rear perspective view of the coupling portion of the cellular phone of FIG. 1 and its surroundings in the closed state of FIG. 1.
Figure 6:
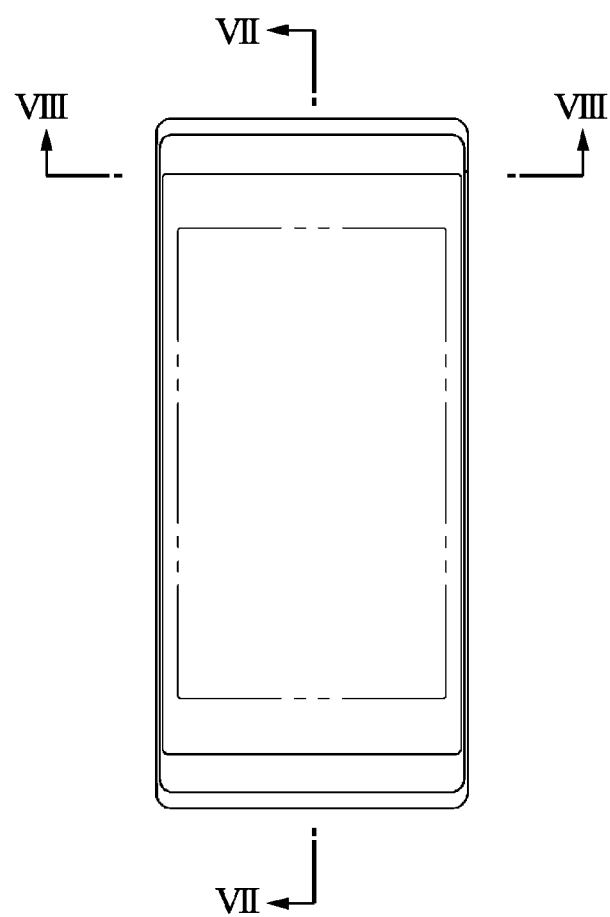
FIG. 6 is a plan view of the cellular phone in the closed state of FIG. 1.
Figure 7:
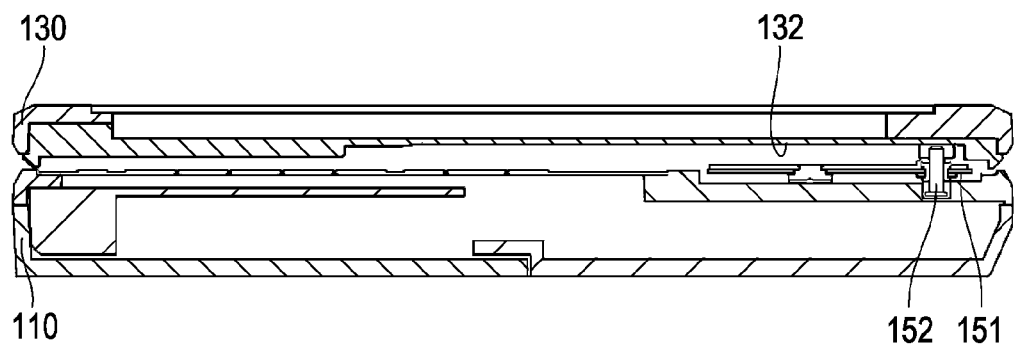
FIG. 7 is a sectional view taken along a line VII-VII passing through the coupling portion of the cellular phone illustrated in FIG. 6.
Figure 8:
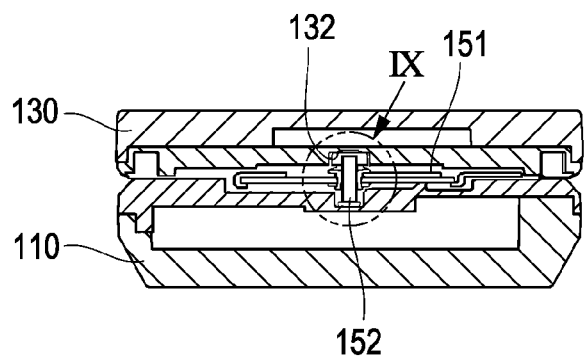
FIG. 8 is a sectional view taken along a line VIII-VIII passing through the coupling portion of the cellular phone illustrated in FIG. 6.
Figure 9:
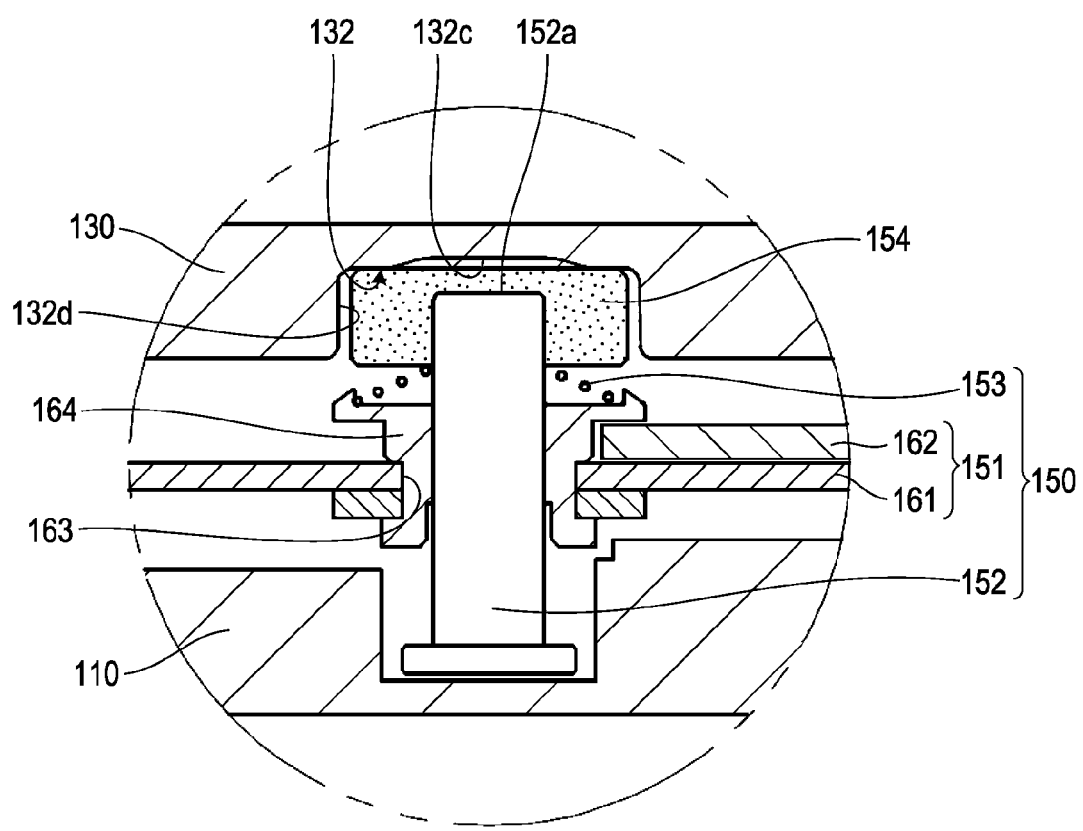
FIG. 9 is an enlarged view of a region IX illustrated in FIG. 8.

Next, an example configuration of the coupling portion 150 and its surroundings of the cellular phone 100 according to some embodiments will be described. FIG. 4 is an exploded perspective view of the coupling portion 150 and its surroundings in the closed state of FIG. 1. FIG. 5 is an exploded rear perspective view of the coupling portion 150 and its surroundings in the closed state of FIG. 1. FIG. 6 is a plan view of the cellular phone 100 in the closed state of FIG. 1. FIG. 7 is a sectional view taken along a line VII-VII passing through the coupling portion 150 of the cellular phone 100 illustrated in FIG. 6. FIG. 8 is a sectional view taken along a line VIII-VIII passing through the coupling portion 150 of the cellular phone 100 illustrated in FIG. 6. FIG. 9 is an enlarged view of a region IX illustrated in FIG. 8.

As illustrated in FIGS. 4 and 5, the coupling portion 150 may be provided between the fixed-side housing 110 and the movable-side housing 130. A surface of the movable-side housing 130 facing the fixed-side housing 110 may be formed in a substantially rectangular shape. Near a center of the surface of the movable-side housing 130 facing the fixed-side housing 110, a guide groove 132 (FIG. 5) is formed that restricts the direction of movement of the fixed-side housing 110 and the movable-side housing 130 with respect to each other. The guide groove 132 may be formed in a substantially L-shape by combining a guide groove 132a and a guide groove 132b. In the illustrated embodiment, the guide groove 132a extends from one of two short sides of the surface of the movable-side housing 130 facing the fixed-side housing 110 toward the other short side, and restricts the direction in which the movable-side housing 130 slides relative to the fixed-side housing 110. The guide groove 132b extends from one end of the guide groove 132a toward one of two long sides of the surface of the movable-side housing 130 facing the fixed-side housing 110, and restricts the direction in which the movable-side housing 130 rotates relative to the fixed-side housing 110.

A pair of rail members 133, 133 are attached to the two long sides of the surface of the movable-side housing 130 facing the fixed-side housing 110, with the guide groove 132 therebetween.

As illustrated in FIGS. 7, 8 and 9, the coupling portion 150 may include a coupling main body 151, a guide pin 152, and a spring 153 (FIG. 9).

With combined reference to FIGS. 5 and 9, the coupling main body 151 includes a base plate 161 and a swing plate 162. The base plate 161 may be fixed to the surface of the fixed-side housing 110 facing the movable-side housing 130 with screws or the like. The swing plate 162 may be rotatably attached to the base plate 161. The swing plate 162 may include a pair of arm portions 162a, 162a (see FIGS. 4 and 5). The pair of arm portions 162a, 162a may be slidably engaged by the pair of rail members 133, 133 attached to the two long sides of the surface of the movable-side housing 130 facing the fixed-side housing 110. As such, the swing plate 162 may be rotatably attached to the fixed-side housing 110 and may be slidably attached to the movable-side housing 130. The fixed-side housing 110 and the movable-side housing 130 are thereby slidably and rotatably coupled to each other.

The guide pin 152 may protrude from the coupling main body 151 so as to be able to advance and retreat, or travel, within the guide groove 132. Specifically, and as illustrated in FIG. 9, the guide pin 152 may be inserted into a boss portion 164 fitted in an attachment hole 163 formed through both the base plate 161 and the swing plate 162, and may thereby protrude from the coupling main body 151 so as to be able to advance and retreat within the guide groove 132.

A tip portion 152a of the guide pin 152 may be received in the guide groove 132 of the movable-side housing 130. When the movable-side housing 130 slides or rotates relative to the fixed-side housing 110, the guide pin 152 is configured to travel within the guide groove 132 within the range restricted by the guide groove 132. As a result, the fixed-side housing 110 and the movable-side housing 130 can be moved smoothly.

As illustrated in FIG. 9, a roller member 154 may be rotatably attached to the tip portion 152a of the guide pin 152. The roller member 154 may be formed of an elastic soft material such as rubber or resin in some embodiments. Moreover, the guide groove 132 may include a bottom portion 132c and a side portion 132d adjacent to the bottom portion 132c. The roller member 154 may be configured to rotate in contact with at least one of the bottom portion 132c and the side portion 132d of the guide groove 132 and may thereby function as a buffering member between the guide pin 152 and the guide groove 132. Accordingly, when the guide pin 152 travels in the guide groove 132 within the range restricted by the guide groove 132, the shock and friction applied to the guide groove 132 by contact with the guide pin 152 may be absorbed by the roller member 154. As a result, the guide groove 132 may be protected from being scratched or scraped by the tip portion 152a of the guide pin 152.

In some embodiments, a depth of the bottom portion 132c of the guide groove 132 may be greater near a middle of the bottom portion 132c further from the side portion 132d than near sides of the bottom portion 132c closer to the side portion 132d of the guide groove 132. Therefore, when the guide pin 152 travels in the guide groove 132, the roller member 154 attached to the guide pin 152 may be primarily in contact with a part of the bottom portion 132c of the guide groove 132 near the side portion 132d. Accordingly, although the part of the bottom portion 132c of the guide groove 132 near the side portion 132d, which is less visible, may be relatively more likely to be scratched or scraped by contact with the roller member 154, the part in the middle of the bottom portion 132c, which is more visible, may be relatively less likely to be scratched or scraped by contact with the roller member 154. As a result, an appearance of the guide groove 132 may be improved.

The spring 153 may be interposed between the boss portion 164 of the coupling main body 151 and the roller member 154 attached to the guide pin 152, and may be configured to urge the guide pin 152 toward the bottom portion 132c of the guide groove 132. The spring 153 is an example of an urging member. In the event that the fixed-side housing 110 and the movable-side housing 130 are disassembled or otherwise moved away from each other for any reason, the guide pin 152 may be urged by the spring 153 toward the bottom portion 132c of the guide groove 132, such that the tip portion 152a of the guide pin 152 remains in the guide groove 132. As a result, the guide pin 152 is prevented from being accidentally withdrawn from the guide groove 132.

As described above, in these and other embodiments, the guide pin 152 may be provided so as to be able to advance and retreat in the coupling main body 151 fixed to the fixed-side housing 110. Further, the guide pin 152 may be urged by the spring 153 toward the bottom portion 132c of the guide groove 132 of the movable-side housing 130. As such, if the bottom portion 132c of the guide groove 132 is moved away from the guide pin 152, the guide pin 152 may be urged by the spring 153 toward the bottom portion 132c of the guide groove 132 such that the tip portion 152a remains in the guide groove 132. Therefore, the guide pin 152 is prevented from being accidentally withdrawn from the guide groove 132, and the guide pin 152 and the guide groove 132 can continue to restrict movement of the fixed-side housing 110 and the movable-side housing 130 with respect to each other. Unlike a conventional electronic apparatus in which a flange for preventing withdrawal is formed at the tip of a guide pin, some embodiments disclosed herein eliminate the need for a flange. As the embodiments disclosed herein lack such a flange, the thickness of the entire apparatus is not increased to accommodate the thickness of the flange. Thus, according to some embodiments, the electronic apparatus may be relatively less thick than an electronic apparatus implementing a guide pin with a flange, while the moving direction of the two housings is stably restricted.

In these and other embodiments, the roller member 154 serving as a buffering member is attached to the tip portion 152a of the guide pin 152, and the roller member 154 may be in contact with at least one of the bottom portion 132c and the side portion 132d of the guide groove 132. As such, scratching or scraping of the guide groove 132 by the tip portion 152a of guide pin 152 may be prevented and/or reduced compared to a conventional apparatus.

In these and other embodiments, the roller member 154 may be rotatably attached to the tip portion 152a of the guide pin 152. Accordingly, friction applied to the guide groove 132 by contact with the roller member 154 may cause the roller member 154 to rotate such that scratching or scraping of the guide groove 132 by the roller member 154 is prevented and/or reduced.

In these and other embodiments, the depth of the bottom portion 132c of the guide groove 132 may be greater near a middle of the bottom portion 132c further from the side portion 132d than near sides of the bottom portion 132c closer to the side portion 132d of the guide groove 132. Accordingly, the part in the middle of the bottom portion 132c, which may be relatively more visible than the sides of the bottom portion 132c near the side portion 132d, may be less likely to be scratched or scraped than the sides of the bottom portion 132c near the side portion 132d, such that the appearance of the guide groove 132 may be improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An electronic apparatus comprising:
   a first housing;
   a second housing; and
   a coupling portion movably coupling the first housing and the second housing to each other,
   wherein the first housing includes a guide groove formed in a surface of the first housing facing the second housing that restricts a direction of movement of the first housing and the second housing with respect to each other, the guide groove including a bottom surface enclosed by at least two sides of the guide groove, facing the second housing and running through the entire length of the guide groove, and
   wherein the coupling portion includes:
      a coupling main body fixed to a surface of the second housing facing the first housing;
      a guide pin protruding from the coupling main body so as to be able to advance and retreat within the guide groove, the guide pin including a tip portion, the tip portion being received in the guide groove;
      a buffering member attached to the tip portion of the guide pin and in contact with the bottom surface of the guide groove; and
      an urging member configured to urge the guide pin toward the bottom surface of the guide groove.

2. The electronic apparatus according to claim 1, wherein the buffering member is rotatably attached to the tip portion of the guide pin.

3. The electronic apparatus according to claim 1, wherein the buffering member comprises an elastic soft material.

4. The electronic apparatus according to claim 1, wherein a depth of a middle portion of the bottom surface of the guide groove that is away from a side portion of the guide groove is deeper than the side portion of the guide groove.

5. The electronic apparatus according to claim 1, wherein the electronic apparatus comprises a cellular phone, a personal computer, a Personal Digital Assistant, or a portable game machine.

6. The electronic apparatus according to claim 1, wherein the first housing comprises a display screen.

7. The electronic apparatus according to claim 1, wherein the second housing comprises a plurality of operating buttons.

8. An electronic apparatus comprising:
a fixed-side housing including a first surface;
a movable-side housing including a second surface facing the first surface of the fixed-side housing and a guide groove formed in the second surface, the guide groove including a bottom surface enclosed by at least two sides of the guide groove, facing the first surface of the fixed-side housing and running through the entire length of the guide groove;
a pair of rail members attached to the movable-side housing at opposing long sides of the second surface of the movable-side housing;
a coupling portion configured to rotatably and slidably couple the fixed-side housing and the movable-side housing together, the coupling portion comprising:
a coupling main body including a base plate attached to the first surface of the fixed-side housing and a swing plate rotatably attached to the base plate, wherein the swing plate includes a pair of arm portions slidably engaged by the pair of rail members;
a guide pin protruding from the coupling main body and configured to travel within the guide groove within a range restricted by the guide groove, the guide pin including a tip portion configured to be received in the guide groove;
a buffering member attached to the tip portion of the guide pin and configured to buffer contact between the tip portion of the guide pin and the guide groove; and
an urging member configured to urge the guide pin toward the bottom surface of the guide groove.

9. The electronic apparatus according to claim 8, wherein the base plate includes a hole formed therein in which the guide pin is positioned with the tip portion protruding through an arcuate slot formed in the swing plate such that the swing plate can rotate with respect to the base plate.

10. The electronic apparatus according to claim 9, wherein the coupling portion further comprises a boss portion attached to the base plate in the hole formed therein.

11. The electronic apparatus according to claim 10, wherein the urging member is interposed between the boss portion and the buffering member so as to urge the guide pin toward the bottom surface of the guide groove and prevent accidental removal of the tip portion from the guide groove.

12. The electronic apparatus according to claim 8, wherein the guide groove comprises:
a first guide groove extending lengthwise from one of two short sides of the second surface of the movable-side housing toward the other of the two short sides, the first guide groove configured to restrict a direction in which the movable-side housing can slide relative to the fixed-side housing; and
a second guide groove arcuately extending from one end of the first guide groove toward one of the opposing long sides of the second surface of the movable-side housing, the second guide groove configured to restrict a direction in which the movable-side housing can rotate with respect to the fixed-side housing.

13. The electronic apparatus according to claim 8, wherein the guide groove includes a side portion and the coupling portion is in contact with at least one of the bottom surface and the side portion of the guide groove.

14. The electronic apparatus according to claim 13, wherein the buffering member is rotatably attached to the tip portion of the guide pin.

15. The electronic apparatus according to claim 13, wherein the buffering member comprises rubber or resin.

16. The electronic apparatus according to claim 8, wherein a depth of a middle portion of the bottom surface of the guide groove that is away from a side portion of the guide groove is deeper than the side portion of the guide groove.

17. The electronic apparatus according to claim 8, wherein the electronic apparatus comprises a cellular phone, a personal computer, a Personal Digital Assistant, or a portable game machine.

18. A cellular phone comprising:
a fixed-side housing including a first surface;
a movable-side housing including:
a second surface facing the first surface of the fixed-side housing; and
a guide groove formed in the second surface, the guide groove including a bottom surface enclosed by at least two sides of the guide groove, facing the first surface of the fixed-side housing and running through the entire length of the guide groove;
a pair of rail members attached to the movable-side housing at opposing long sides of the second surface of the movable-side housing;
a coupling portion configured to rotatably and slidably couple the fixed-side housing and the movable-side housing together, the coupling portion comprising:
a coupling main body including a base plate attached to the first surface of the fixed-side housing and a swing plate rotatably attached to the base plate, wherein the swing plate includes a pair of arm portions slidably engaged by the pair of rail members;
a boss portion attached to the base plate in a hole formed therein;
a guide pin protruding from the coupling main body and configured to travel within the guide groove within a range restricted by the guide groove, the guide pin including a tip portion configured to be received in the guide groove and the guide pin being positioned in the boss portion with the tip portion protruding through an arcuate slot formed in the swing plate such that the swing plate can rotate with respect to the base plate;
a roller member attached to the tip portion of the guide pin and configured to buffer contact between the tip portion of the guide pin and the guide groove; and
a spring interposed between the boss portion and the roller member so as to urge the guide pin toward the bottom surface of the guide groove and prevent accidental removal of the tip portion from the guide groove.

19. The cellular phone according to claim 18, wherein:
the first housing comprises a display screen; and
the second housing comprises a plurality of operating buttons.

* * * * *